Figure 1:
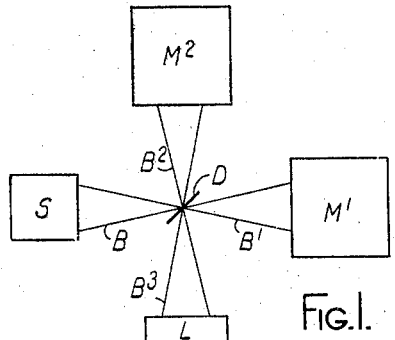

March 21, 1939. W. E. WILLIAMS 2,151,631
OPTICAL INTERFEROMETER
Filed May 4, 1937 2 Sheets-Sheet 1

INVENTOR
WILLIAM E. WILLIAMS
By Norris & Bateman
ATTORNEYS

March 21, 1939.    W. E. WILLIAMS    2,151,631
OPTICAL INTERFEROMETER
Filed May 1937    2 Sheets-Sheet 2

INVENTOR
WILLIAM E. WILLIAMS
By Norris & Bateman
ATTORNEYS

Patented Mar. 21, 1939

2,151,631

UNITED STATES PATENT OFFICE 2,151,631

OPTICAL INTERFEROMETER

William Ewart Williams, Hampstead, London, England

Application May 4, 1937, Serial No. 140,709
In Great Britain May 7, 1936

1 Claim. (Cl. 88—14)

This invention relates to optical interferometers.

In the well known Michelson type of interferometer the two beams are obtained by partial reflection and transmission at a partially silvered dividing mirror, the effective aperture of which has to be substantially the same as that of the other mirrors in the interferometer and of the observing telescope. In the modification of this instrument by Twyman and Green as set forth in British Patent No. 130,224, the beam incident on the dividing mirror is made strictly parallel so that its effective aperture has to be equivalent to that of the prism or lens under test.

According to the present invention the division of the light into two beams is effected at a position where the incident beam has converged substantially to a point so that a dividing mirror of very small dimensions, say of the order of one millimetre diameter or even less, would be sufficient. The main advantage of the invention arises from the fact that whereas in the aforesaid prior interferometers it is essential that the dividing mirror is optically true over the whole of its large aperture, it is easy and economical to provide an optically true dividing mirror of the small size required by the present invention and it will usually be possible to employ a piece of ordinary reasonably true glass. The usual compensator plate, if placed in the appropriate beam close to the dividing mirror, may be also similarly reduced in size. For many purposes however such compensator plate is unnecessary.

In carrying out the invention according to one arrangement a point source of light is focussed on the dividing mirror and the two beams diverging from a relatively minute area on said dividing mirror fall on two concave mirrors or equivalent systems with the centre of said relatively minute area as their effective centre of curvature, allowance being made for the increased optical path through the dividing mirror or the compensator plate if employed. When a small ocular or lens of short focal length is used and the eye placed at the image of said relatively minute area in said lens a set of interference fringes is seen. If the concave mirrors or the equivalent systems are accurately made and placed at the proper distance from the dividing mirror straight line fringes are seen if one mirror or equivalent is slightly tilted. Said concave mirrors may be replaced by two lenses interposed one in each beam with the centre of said minute area as their common focus whilst the light from each lens falls normally on a plane mirror which in turn reflects back the light to the dividing mirror. If one of said plane mirrors is slightly tilted, straight line fringes are seen, which move across the field as the mirror is displaced towards or away from the lens. It will be obvious that alternatively a single concave mirror may be used in one beam of the interferometer whilst a lens and a plane mirror may be used in the other beam thereof.

With accurately constructed concave and plane mirror surfaces, the optical quality of a lens may be assessed from the deformation of the fringe pattern that would be theoretically expected. With accurate adjustment of the interferometer, and equality of optical paths, the field should be of uniform brightness. The position of the fringes may be marked on the lens surface and then the lens may be repolished locally to correct the indicated errors. The same lens can be tested for its behaviour with oblique beams by tilting it and simultaneously displacing the lens further from the minute area on the dividing mirror so that the latter area remains on the focal plane of the lens. This can be easily effected by pivoting the lens about the appropriate nodal point on one arm of a right-angled or L-shaped cam, the other arm of which always bears against a fixed pin immediately above or below the minute area on the dividing mirror. A plane mirror requires no displacement in this instance; such a mechanism is known in the art as a nodal slide.

The interferometer according to the invention may be arranged to obtain interferometric comparisons fetween the optical performance of a lens system under test, and that of a standard lens system. For this purpose one lens system is fitted on each interferometer arm, and by means of a simple lever or cam arrangement the two lens systems can be simultaneously rotated about their appropriate nodal points and displaced equal amounts from the dividing point, so that the performances of the systems with oblique incidence can be compared either in the primary or secondary focal position as desired.

The interferometer may further be arranged to measure path differences that are very large compared with the wavelength of the light. For this purpose a suitable end gauge or Kösters unit may be substituted for the plane mirror followiny either of the lenses, the further observations being carried out as with the usual interferometer, the reference mirror being a concave mirror or a combination of a well corrected lens and a plane mirror.

Instead of recombining the beams at the original dividing mirror it may sometimes be more expedient to arrange for their recombination at a second dividing mirror which may be a small "point" mirror according to this invention or it may be a large aperture plane mirror as heretofore usually employed. In the former case, the observing lens may be placed so that the eye and mirror are conjugate points. To avoid unnecessary loss of light and for other optical reasons the dividing mirror and compensator plate may be constructed in the form of small identical right angled prisms the two parts displaced with respect to each other until exact compensation is obtained. Alternatively the two parts may be formed as parallel plates of equal optical thickness, and the edges so cut and polished that the original incident beam, together with the two exit beams fall normally on the glass.

In a further modification the dividing mirror and/or compensator plates may be in the form of hemispherical lenses, prisms and the like.

To enable the invention to be fully understood it will now be described with reference to the accompanying diagrammatic drawings in which Figure 1 is a basic diagrammatic plan illustrating the principle of the invention.

Figure 6:
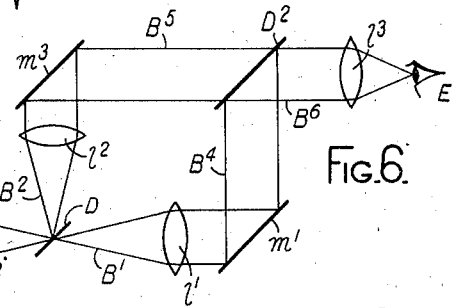
Figure 7:
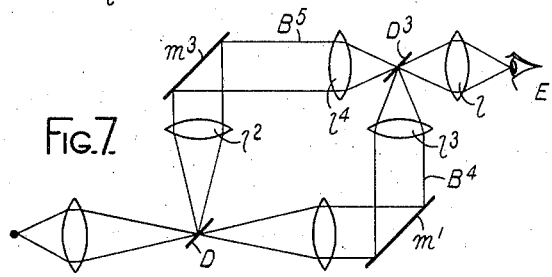
Figure 8:
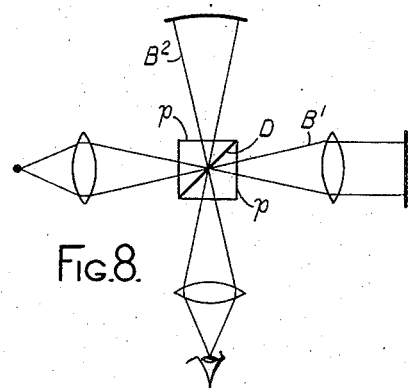
Figure 9:
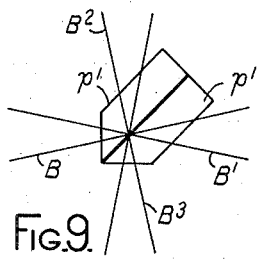

Figs. 2 to 8 are similar views showing in greater detail various ways of carrying out the invention, whilst Fig. 9 is a diagrammatic plan view showing a further form of dividing mirror member which may be used in place of the two dividing mirror members shown in Fig. 8.

In all the figures D is the dividing mirror member which in its elementary form may comprise a plate of glass lightly coated with silver or aluminium or other reflecting medium, such member per se commonly being referred to as half-silvered. The member D has its surfaces disposed at 45° to the centre line of a beam of light which is caused by means of a system S to converge substantially to a point on the near surface of the member D. This converging beam is designated B. Some of the light of the converging beam B passes through the half silvered dividing mirror D in the form of a diverging beam $B^1$ and a reflecting system $M^1$ is provided which reflects back the light in a beam coincident with the beam $B^1$.

Some of the light of the beam B is reflected from the near surface of the dividing mirror D in the form of a diverging beam $B^2$, and a reflecting system $M^2$ is provided which returns said light in a beam coincident with the beam $B^2$.

The light reflected from the reflecting systems $M^1$ and $M^2$ is partially reflected by, and partially transmitted through, the dividing mirror D in the form of a diverging beam $B^3$ and a lens system L is interposed in said beam and adapted to focus the light of the beam $B^3$ to a point E at which the eye may be applied.

Figures 2, 3:
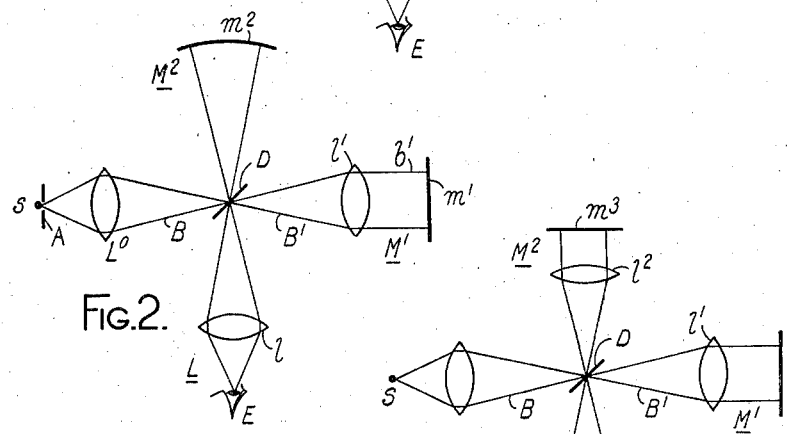
Figure 4:
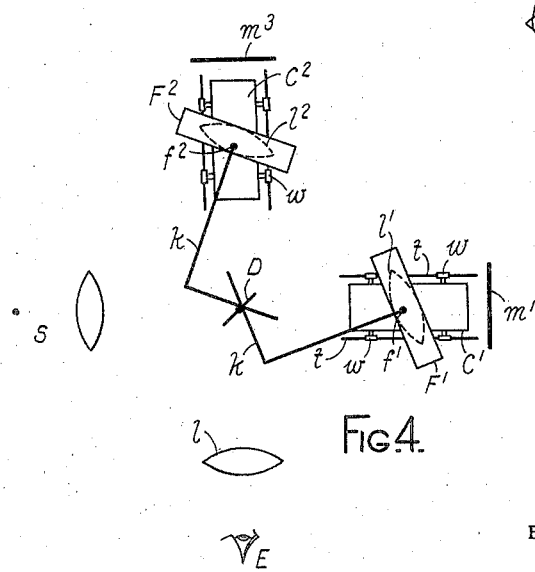

Referring next to Fig. 2 of the accompanying drawings, the system S may comprise a source of light s, an aperture A which may in some cases be of the adjustable iris type and a lens $L^0$. The reflecting system $M^1$ comprises in this particular example a plane mirror $m^1$ and a lens $l^1$ for converting the divergent beam $B^1$ into a parallel beam $b^1$. The reflecting system $M^2$ in this example comprises a concave mirror $m^2$.

The system L comprises an ocular, or lens of short focal length l.

Referring next to Fig. 3, the system therein shown differs only from that shown in Fig. 2, in that the reflecting system $M^2$ instead of comprising the concave mirror $m^2$ comprises the plane mirror $m^3$, and the lens $l^2$ so that the systems $M^1$ and $M^2$ are now similar, and it is to be understood that the system $M^1$ may comprise simply a concave mirror like the mirror $m^2$. It will be appreciated that the plane mirror $m^1$ or $m^3$ and the lens $l^1$ or $l^2$ are equivalent optical systems. In the case of mirrors such as $m^2$ its centre of curvature coincides with the point or relatively minute area given by the beam B on the dividing mirror D.

With the arrangements above described, when the eye is placed at the point E which is the image of the relatively minute area or spot on the dividing mirror D, a set of interferometer fringes will be seen. If the reflecting systems $M^1$ and $M^2$ are accurately made and located at the proper distance from the dividing mirror D, then straight line fringes will be seen if one mirror such as $m^2$ or one lens such at $l^1$ is slightly tilted.

It will be understood that a lens such as $l^1$ or $l^2$ may be under test and undergoing correction for optical faults. Assuming that one of the systems $M^1$ or $M^2$ is optically accurate the optical quality of the lens under test may be assessed from the deformation of the fringe pattern. The fringe pattern may be drawn on a sheet of paper or even on the lens itself and the imperfection of the lens may be corrected in the known manner such as by hand polishing at the places indicated by the irregular fringe pattern.

When it is desired that the lens or lenses shall be tested for oblique beams by tilting them they may be simultaneously displaced further from the dividing mirror D so that the point of the latter always remains on the focal plane of the lens. This tilting and simultaneous displacement may be carried out by means which are known per se and are called nodal slides, a description of forms of which is to be found for example in the specification of British Letters Patent No. 236,634. The manner in which such nodal slides may be applied to the interferometer of the present invention is illustrated diagrammatically in Fig. 4 of the accompanying drawings, wherein it is assumed that there are two plane mirrors $m^1$ and $m^3$ and corresponding lenses $l^1$ and $l^2$, which latter are mounted in frames $F^1$ and $F^2$ respectively which on their under-sides are mounted on pivot pins $f^1$ and $f^2$, the vertical axes of which pins pass through the respective nodal points of the lenses $l^1$ and $l^2$. The pivot pins $f^1$ and $f^2$ are mounted on bearings in carriages or slides $C^1$ and $C^2$ which are constrained to move parallel with the axes of the beams $B^1$ and $B^2$, the illustration of which is omitted from Fig. 4 for the sake of clearness. To this end in accordance with known arrangements, the carriages $C^1$ and $C^2$ may be provided with wheels such as $w$ adapted to run on the members $t$ constituting a constraining track or slide.

Furthermore, the frames $F^1$ and $F^2$ or their respective pins $f^1$ and $f^2$ have rigidly secured with respect thereto lever arms $k$ which are of right-angle bell crank form and the free ends of which always bear against a pin or stop which is vertically beneath the spot or minute area on the dividing mirror D. The arrangement is such that when the frame $F^1$ and its lens $l^1$ therein is rotated about the pivot $f^1$ the carriage $C^1$ is caused to move further from the dividing mirror D by reason of the reaction of the free end of the bell crank lever $k$ on the pin beneath the dividing mirror D. It will be understood moreover that in a more elaborate system the rotation of both frames $F^1$ and $F^2$ may be brought about simultaneously by a single manual operation, such as by connecting said frames together by link-work or other mechanism which may assume any known or convenient form. In any such arrangement the plane mirrors $m^1$ and $m^3$ require no displacement.

If the interferometer according to the invention is required to measure path differences that are very great compared with the wave length of the light there may be substituted for one of the reflecting systems $M^1$ or $M^2$ an end gauge or Kösters' unit. A description of the latter is to be found at page 72 of my Monograph (Methuens) entitled "Applications of Interferometry".

Figure 5:
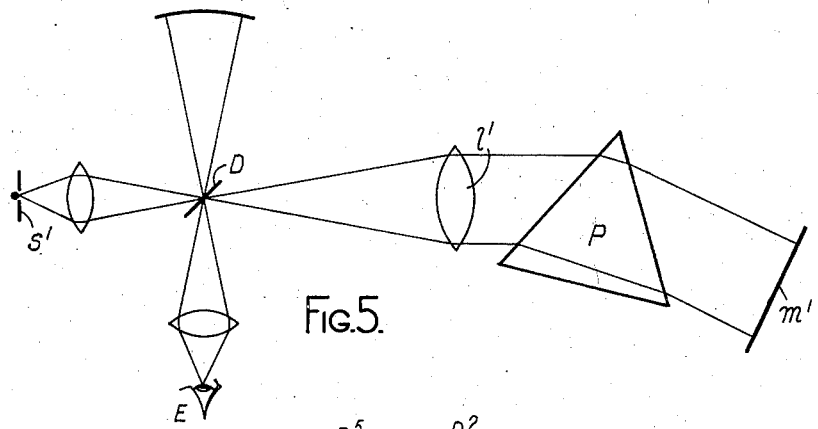

The interferometer according to the invention may be arranged for testing and if desired correcting prisms in the manner indicated by Fig. 5 of the accompanying drawings, the arrangement of which differs only from that illustrated such as in Fig. 2 in that in the first place a line of light is obtained from a slit in a diaphragm $s^1$, whilst the prism P is interposed appropriately between the lens $l^1$ and plane mirror $m^1$ of the reflecting system $M^1$ of Fig. 2. Thus it will be understood that in the appended claim the word "point" when referring to the convergence of the light beams on to the dividing or recombining mirror also includes "line".

In the arrangements so far described the recombination of the reflected beams occurs at the point on the dividing mirror D, and as hereinbefore indicated such recombination may be effected elsewhere as illustrated in Figs. 6 and 7, namely, by arranging the mirrors $m^1$ and $m^3$ at 45° to the axes of the beams $B^1$ and $B^2$, respectively, the lenses $l^1$ and $l^2$ being arranged to provide parallel beams which are reflected from the mirrors $m^1$ and $m^3$ in the form of the beams $B^4$ and $B^5$ respectively which are brought into coincidence on the two sides of an additional dividing or recombining mirror $D^2$, which is of large aperture, the resultant parallel beam $B^6$ from which mirror $D^2$ is viewed at E through a lens $l^3$ of relatively large focal length.

The arrangement shown in Fig. 7 only differs from that shown in Fig. 6 in that the large aperture dividing mirror $D^2$ is replaced by a small dividing mirror $D^3$, which is thus similar to the main or initial dividing mirror D, whilst, furthermore, lenses $l^3$ and $l^4$ are interposed in the beams $B^4$ and $B^5$ respectively so as to converge the light of these beams to coincident points on opposite sides of the dividing mirror $D^3$. The resultant spot thereon is viewed through the ocular $l$.

Referring lastly to Figs. 8 and 9, in Fig. 8 is shown an arrangement which is identical with that of Fig. 2 with the exception that the dividing mirror D instead of being a plate of glass is provided by one of the faces of a pair of identical right-angled prisms $p$, $p$. In Fig. 9 the original dividing mirror D is shown in the form of a pair of adjacent prismatic members $p^1$ having the semi-silvered surface between them. The beams B and $B^3$ are normal to the respective faces on which these beams are incident and emergent.

It is to be understood that the invention is not limited to the specific arrangements hereinbefore illustrated.

It will be further understood that in all of the arrangements above described there may be added a compensator plate. This is not illustrated but it may be arranged as, and for the reasons mentioned, in prior specification No. 103,832.

I claim:

An optical interferometer comprising a partially reflecting and partially transmitting dividing surface, means for converging a beam of light substantially to a point on said dividing surface, a partially reflecting and partially transmitting recombining surface, means for reflecting on to one side of the recombining surface the divergent beam of light transmitted through said dividing surface, means for reflecting on to the other side of said recombining surface the divergent beam of light reflected by said dividing surface, the reflecting means and said recombining surface being so disposed that the paths of the rays transmitted by and reflected from the recombining surface are coincident, and means for forming an image of the recombination effects from said recombining surface.

WILLIAM EWART WILLIAMS.